US012689021B2

(12) United States Patent
Hylton

(10) Patent No.: US 12,689,021 B2
(45) Date of Patent: Jul. 21, 2026

(54) EXPANDED BULK SILICON ANODE MATERIAL

(71) Applicant: FORD GLOBAL TECHNOLOGIES, LLC, Dearborn, MI (US)

(72) Inventor: Bret Hylton, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 588 days.

(21) Appl. No.: 18/312,090

(22) Filed: May 4, 2023

(65) Prior Publication Data

US 2024/0372061 A1      Nov. 7, 2024

(51) Int. Cl.
     *H01M 4/04*          (2006.01)
     *H01M 4/02*          (2006.01)
     *H01M 4/134*         (2010.01)
(52) U.S. Cl.
     CPC ......... *H01M 4/0459* (2013.01); *H01M 4/044* (2013.01); *H01M 4/134* (2013.01); *H01M 2004/027* (2013.01)
(58) Field of Classification Search
     None
     See application file for complete search history.

(56) References Cited

U.S. PATENT DOCUMENTS

| 10,224,540 B2 | 3/2019 | Samarao et al. | |
| 2013/0095596 A1* | 4/2013 | Fray ...................... | H10F 77/703 |
| | | | 438/71 |
| 2016/0028081 A1* | 1/2016 | Zhang ................... | H01M 4/366 |
| | | | 429/231.1 |
| 2018/0277888 A1* | 9/2018 | Fray ...................... | H01M 4/625 |
| 2021/0126250 A1 | 4/2021 | Jiang et al. | |
| 2021/0175491 A1* | 6/2021 | Frieberg ............ | H01M 10/0525 |

FOREIGN PATENT DOCUMENTS

| CN | 104975336 A | 10/2015 |
| DE | 102019213584 A1 | 3/2021 |

* cited by examiner

*Primary Examiner* — Louis J Rufo
(74) *Attorney, Agent, or Firm* — David B. Kelley; Brooks Kushman P.C.

(57) ABSTRACT

A method for making an electrode involves forming a molten salt, attaching a negative terminal of a direct current power source to a silicon blank and a positive terminal of the direct current power source to a sacrificial electrode or a container for the molten salt. The method further involves submerging the silicon blank in the molten salt such that an electrolytic reaction drives alkali metal ions into the lattice of the silicon blank.

14 Claims, 4 Drawing Sheets

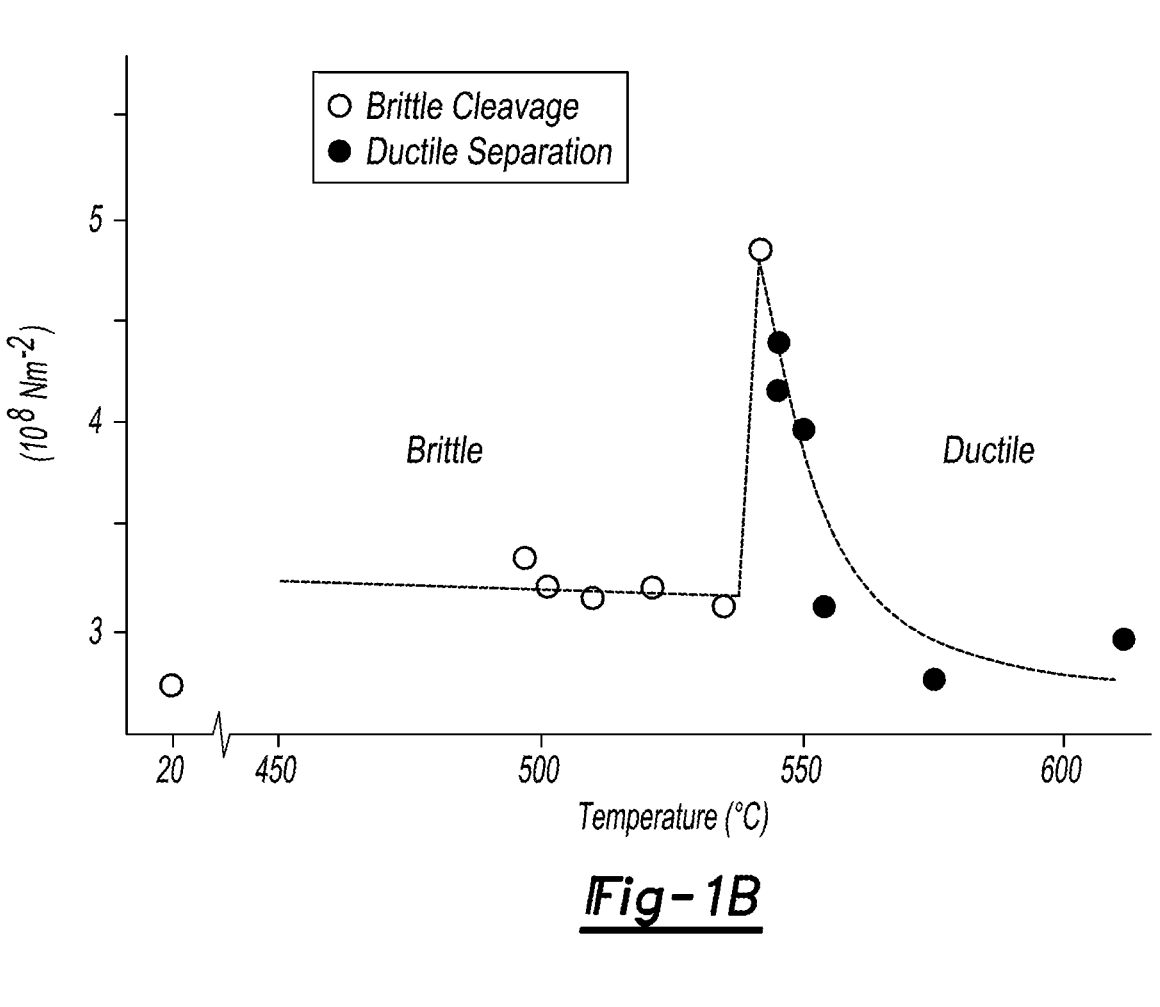
_Fig-1B_
Block One
_10_
Block Two
_12_
Block Three
_14_
_Fig-2_

EXPANDED BULK SILICON ANODE MATERIAL

TECHNICAL FIELD

The disclosure relates to electrode materials for lithium-ion batteries.

BACKGROUND

Energy storage is a consideration as the demand for portable electronic devices, electric vehicles, and renewable energy sources continues to grow. Batteries are common energy storage devices that sometimes rely on electrodes. The electrodes can efficiently store and release electrical charge.

SUMMARY

One method for forming a silicon anode for use in batteries and other energy storage devices involves, putting a bulk silicon blank into a container holding molten salt while applying a negative charge to the silicon blank and a positive charge to a sacrificial electrode or container for the molten salt. This causes an electrolytic reaction driving alkali metal ions from the molten salt into the silicon blank lattice. The anode is taken out of the molten salt after a set time and cooled. A current collector can be placed on the anode, and some of the alkali metal ions remain in the anode after discharge. The temperature of the molten salt is at least 500 degrees C., and the alkali metal ion used can be sodium or lithium. The silicon blank can be a silicon wafer.

Alternatively, a method for forming an electrode for use in batteries or other energy storage devices involves heating sodium or lithium hydroxide until it becomes a molten salt, then attaching a direct current power source to a silicon wafer and a sacrificial electrode or a container of the molten salt. The silicon wafer is lowered into the molten salt, causing sodium or lithium ions to be driven into the silicon and forming an ion laden anode. After the anode has reached its maximum capacity, it is raised out of the molten salt and allowed to cool.

BRIEF DESCRIPTION OF THE DRAWINGS

FIG. 1B is a graph showing the ultimate strength of intrinsic silicon across a temperature range.

FIG. 2 is a flow chart of a method for forming silicon anode material.

DETAILED DESCRIPTION

Figure 1A:
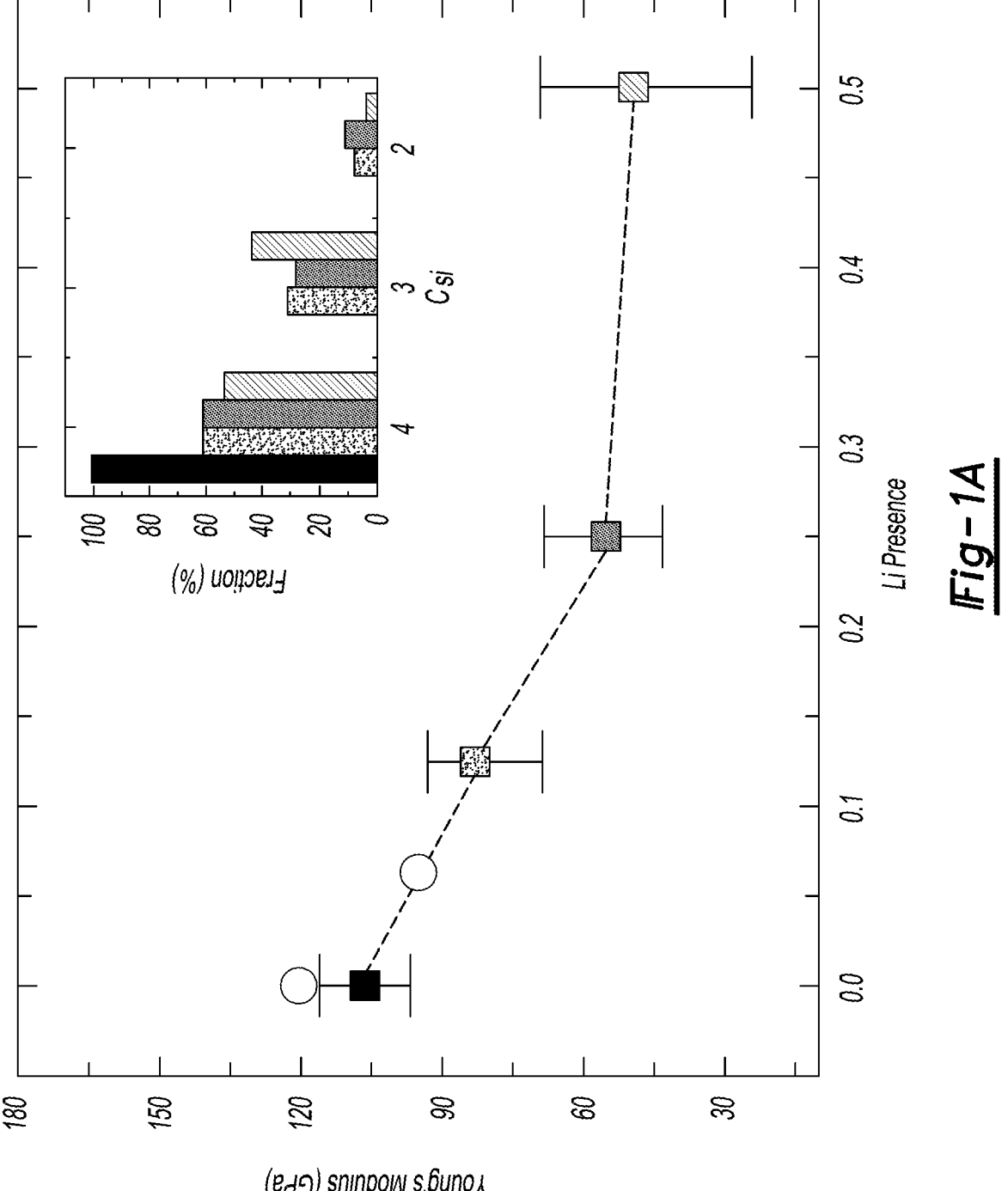
FIG. 1A is a graph showing the relationship between young's modulus and lithium presence in silicon.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Traditionally, graphite has been used as an anode material for lithium-ion batteries. However, the capacity of graphite anodes may be limited, and there is a need for higher-capacity anode materials to increase battery performance. Silicon is a promising candidate material for anodes due to its high theoretical capacity for lithium-ion storage, which is approximately ten times that of graphite.

The charge/discharge cycling of silicon anodes can lead to a decrease in capacity over time. This degradation is due to the volume expansion of silicon during lithiation, which causes the material to lose electrical contact. To overcome this limitation, various methods have been proposed to increase the performance of silicon anodes, including nano structuring, alloying with other elements, and using carbon coatings. However, these methods are often complex and time consuming, and there is a need for a simple, effective method for producing high-performance silicon anodes.

Silicon-based anodes for batteries have shown great promise in energy storage capacity and performance. However, conventional methods of producing silicon anodes can be complicated, leading to potential issues such as cracking and poor cycle life. Novel methods of forming an electrode have been developed to address these challenges and enhance the overall battery performance. In one example, a bulk silicon blank is submerged into a molten salt alongside a sacrificial electrode. A negative potential is applied to the silicon blank, while a positive potential is applied to the silicon blank, and simultaneously a positive potential is applied to the sacrificial electrode or container holding the molten salt. The concurrent application of potentials and submersion in the molten salt initiates an electrolytic reaction, driving alkali metal ions such as sodium or lithium ions from the molten salt into the silicon blank's lattice.

This method facilitates the formation of an anode with ductile deformation, which can accommodate the stress and strain induced by the insertion of alkali metal ions. By carefully controlling the process parameters, including the temperature of the molten salt, the predetermined submersion time, level of DC voltage applied, and the choice of alkali metal ions, this method allows the formation of high-performance silicon anodes with enhanced energy storage capacity and cycle life. This advancement in electrode manufacturing has the potential to further the field of energy storage and pave the way for the development of more efficient, longer-lasting batteries for a wide range of applications.

FIG. 1A shows a graphical representation of the relationship between young's modulus and lithium presence in silicon, highlighting the mechanical property changes that occur during the process of lithium insertion into silicon material. This relationship may be helpful to understanding the mechanical stability and performance of silicon when used as an anode material. The x-axis represents the lithium presence in the silicon lattice. The y-axis represents young's modulus, a measure of a material's stiffness, expressed in units of pressure, gigapascals (GPa). The figure shows as lithium ions are inserted into the silicon lattice, young's modulus of the silicon material decreases, indicating increased ductility and reduced stiffness.

FIG. 1B shows a graphical representation of the ultimate strength of silicon as a function of temperature, highlighting the temperature-dependent mechanical properties of silicon. Understanding the ultimate strength of silicon across a temperature range is helpful when ensuring mechanical stability and performance under various operating conditions. In FIG. 1B the x-axis represents the temperature, expressed in degrees Celsius (° C.). The y-axis represents the ultimate strength of silicon expressed in units of pressure $(Nm^2)$. The figure illustrates that around 550 degrees Celsius the ultimate strength of silicon greatly increases. The ultimate strength of silicon at and above that temperature goes from one of brittle cleavage to ductile ultimate strength.

Figure 1C:
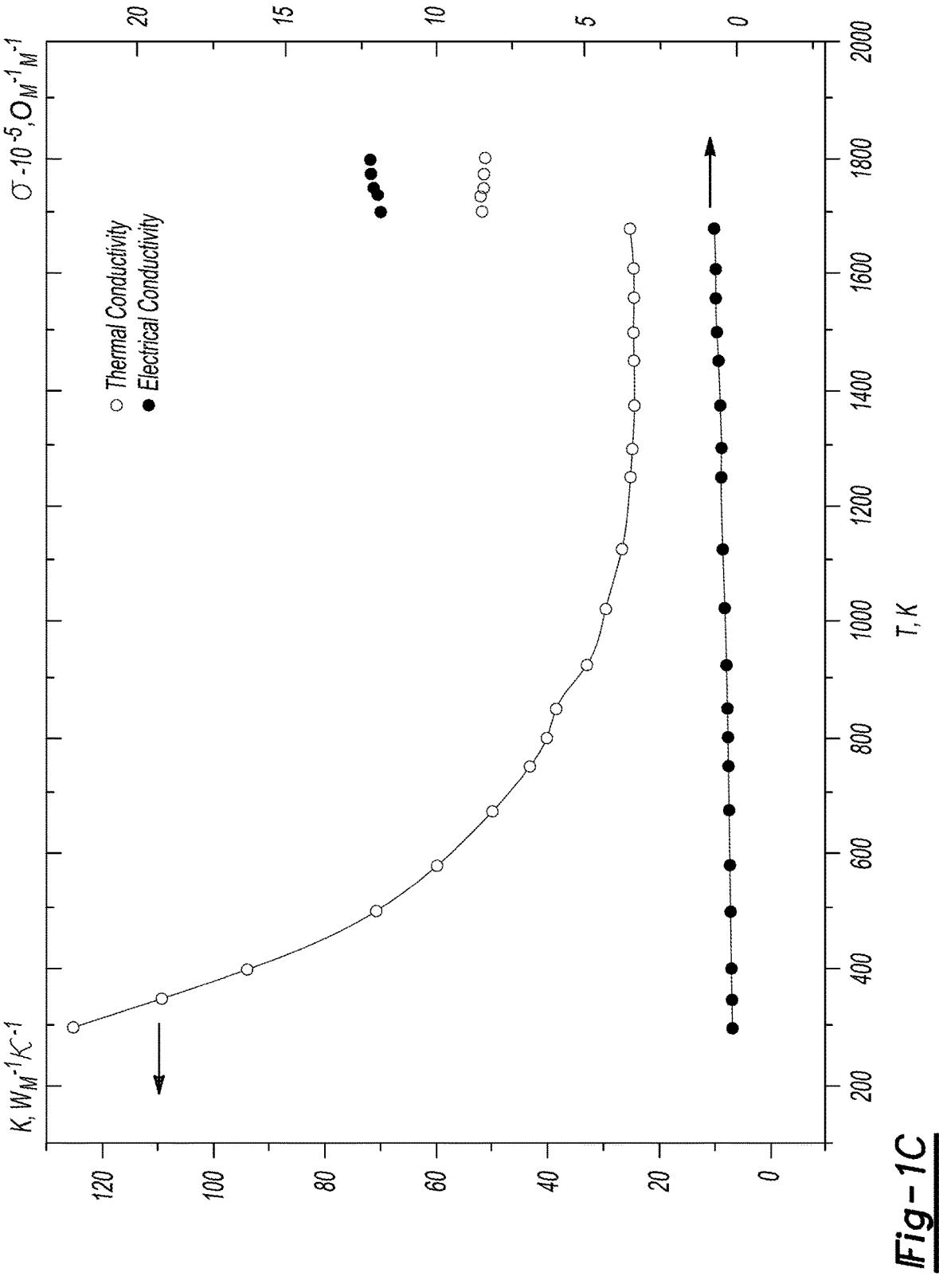
FIG. 1C is a graph showing temperature dependence of thermal and electrical
conductivities of silicon.

FIG. 1C shows a graphical representation of the temperature dependence of both thermal and electrical conductivities of silicon. In FIG. 1C, the x-axis represents temperature in Kelvin (K), and the y-axis represents both thermal and electrical conductivity of silicon. The thermal conductivity is expressed in units of watts per meter-kelvin (W/mK), a measure of a material's ability to transfer heat. Electric conductivity is a measure of a material's ability to conduct electrical current, denoted by the symbol o and is expressed in units of ohm-meters $(OM^{-1}M^{-1})$. The two curves illustrate the change in thermal and electrical conductivities in silicon as a function of temperature. While silicon's thermal conductivity is temperature dependent, decreasing with increased temperature, silicon's electrical conductivity is largely temperature independent.

Referring now to FIG. 2, at Block One 10 the molten salt solution is prepared, and the silicon blank is attached to a power source. In the first step of the process, sodium hydroxide or lithium hydroxide is heated to a temperature of at least 500 degrees Celsius, resulting in the formation of a molten salt. A silicon wafer, which can be used as the bulk silicon blank, is prepared for the process by attaching a negative terminal of a direct current (DC) power source to it. Simultaneously, a positive terminal of the DC power source is attached to a sacrificial electrode or the container holding the molten salt. This setup establishes an electrochemical cell, where the silicon wafer acts as the working electrode and the sacrificial electrode or the container acts as the counter electrode. Maintaining the temperature of the molten salt at least 500 degrees Celsius ensures the silicon is in its ductile phase, as shown in FIG. 1B, during the electrode formation process. When silicon is in its ductile phase, it exhibits increased flexibility and deformability, which facilitates the incorporation of alkali metal ions, such as sodium or lithium ions, into its lattice structure.

In Block Two 12, the silicon wafer is carefully lowered into the molten salt while the DC power source applies a negative potential to the wafer and a positive potential to the sacrificial electrode or the container. This potential difference causes an electrolytic reaction between the molten salt and the silicon wafer, driving alkali metal ions, which can be sodium or lithium ions, from the molten salt into the lattice of the silicon wafer. This process continues for a predetermined period of time, during which the silicon wafer undergoes ductile deformation, resulting in the formation of an anode with maximum holding capacity for the alkali metal ions.

This predetermined period of time can correspond to a duration of submersion that allows the silicon wafer to achieve its maximum holding capacity, ensuring the electrolytic reaction between the molten salt and the silicon wafer effectively drives alkali metal ions into the lattice of the silicon wafer. The predetermined period of time is experimentally determinable from composition and weight percentage of the molten salt, and the type of alkali meal ion, the dimension of the silicon blank, and the specific operating conditions, including temperature and current density. By varying these factors and monitoring the performance of the ion laden silicon anode material during experimental trials, the optimal predetermined period of time can be established. Such trials may involve measuring the amount of alkali metal ions incorporated into the silicon lattice, the overall capacity of the anode, or other relevant performance indicators.

Alternatively, the silicon wafer can be submerged until it reaches its maximum holding capacity, meaning the lattice of the silicon wafer is fully ion laden. The maximum holding capacity can similarly be experimentally determined through known methods. Once the predetermined period of time has passed and the anode has achieved its maximum holding capacity, in Block Three 14, the anode is removed from the molten salt and allowed to cool down to room temperature. After cooling, the anode is assembled into an electrochemical cell by arranging a current collector in contact with the anode. This assembly may also include other components, such as a separator, a cathode, and an electrolyte, depending on the specific design of the cell. The resulting electrochemical cell featuring the silicon anode material can be utilized in various energy storage applications, such as batteries for electric vehicles or portable electronics.

Figure 3:
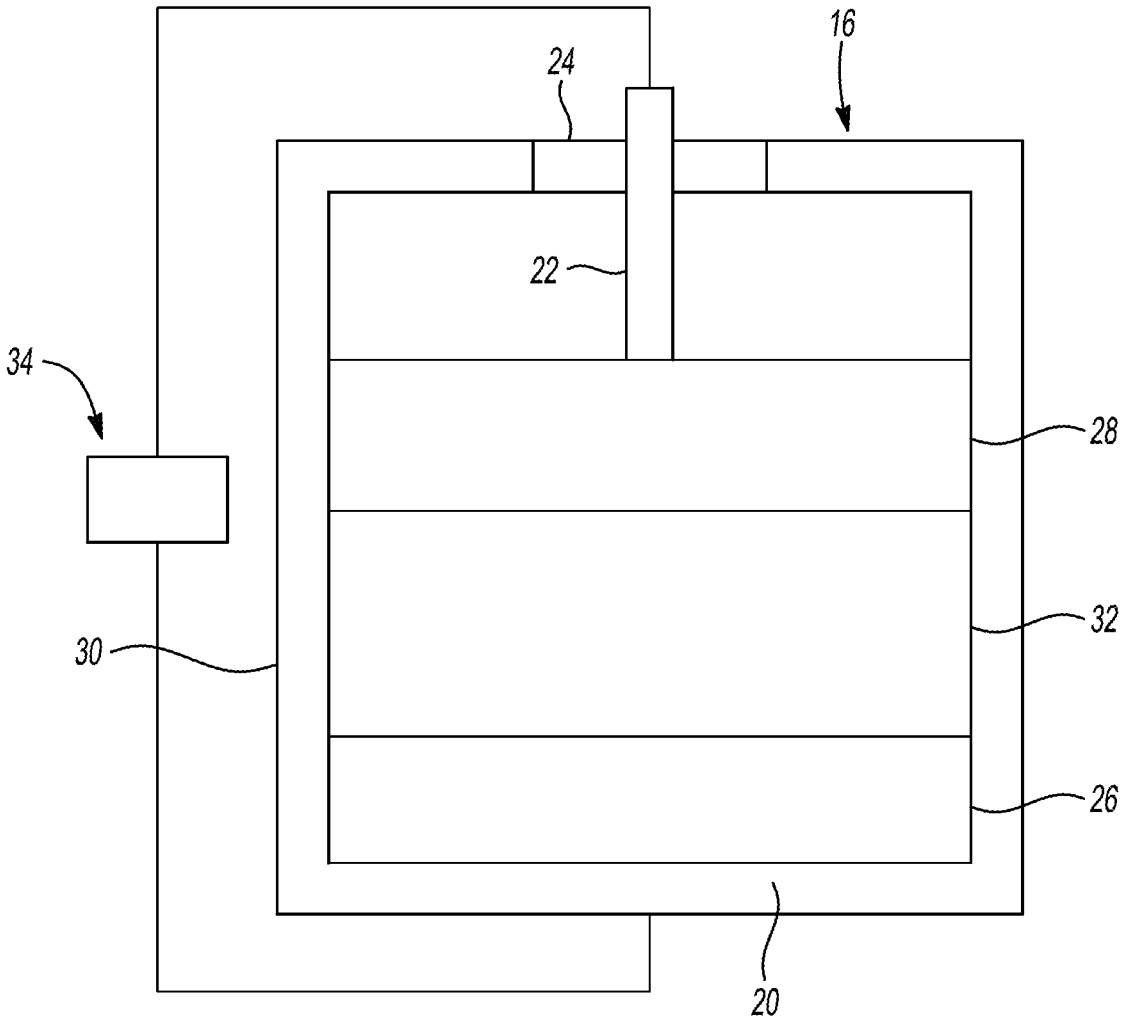
FIG. 3 is a schematic diagram of a lithium-ion battery.

Referring now to FIG. 3, which shows an assembled battery cell 16. The cell 16 is designed for efficient energy storage and utilizes the novel silicon anode material 18 as described above. The cell 16 is comprised of several components, including a positive current collector 20, a negative current collector 22, a ceramic insulator 24, a cathode 26, an anode 28, an insulating sheath 30, and a molten salt electrolyte 32.

In an assembled cell 16, the ion laden silicon anode 28 can be in contact with a separator (not shown), a thin layer that separates the cathode 26 and anode 28 and prevents direct contact between them. The silicon anode 22 can also be in contact with the molten salt electrolyte 32, and the negative current collector 22. As the anode 28 is a result of the novel process described herein, it is particularly ion laden. The negative current collector 22 is responsible for facilitating electron transfer between the anode 28 and an external circuit 34 during discharging and charging processes.

The cathode 26 can be in contact with the separator (not shown), the molten salt electrolyte 32, and the positive current collector 20. Like the negative current collector 22, the positive current collector 20 ensures efficient electron transfer between the cathode 26 and the external circuit 34. The cathode 26 can be any metal oxide, such as lithium cobalt oxide (LCO), lithium iron phosphate (LFP), or lithium manganese oxide (LMO). The ceramic insulator 24 is positioned between the positive and negative electrodes 26, 28, preventing electrical short-circuits and maintaining the physical separation therebetween. The ceramic insulator 24 may be comprised of material such as zirconia, alumina, or other suitable ceramic materials known for their excellent insulating properties and stability under high temperatures.

The molten salt electrolyte 32 is contained within the cell 16, filling the space between the anode 28 and the cathode 26. The electrolyte 32 is responsible for facilitating the ionic transport of alkali metal ions between the anode 28 and the cathode 26 during the charging and discharging processes. The molten salt electrolyte 32 can be derived from sodium or lithium hydroxide, or from other suitable salts that ensure efficient ionic conductivity. An insulating sheath 30 is used to encase the assembled cell 16, providing both mechanical protection and electrical insulation. The insulating sheath 30 can be made from a non-conductive and thermally stable material, such as a polymer or a ceramic, capable of withstanding the operating temperatures and conditions of the electrochemical cell 16.

The battery cell 16 can be assembled to form a battery pack. During the operation of the assembled battery cell 16, a load is connected to the external circuit 34, drawing energy from the cell 16. As the cell 16 discharges, alkali metal ions, such as sodium or lithium ions, migrate from the anode 28 through the molten salt electrolyte 32, toward the cathode 26. Concurrently, the electrons flow through the external circuit 34 from the negative current collector 22 to the positive current collector 20, supplying power to the load. The efficient movement of ions within the cell 16 and their transfer to the load are helpful for maintaining optimal performance and energy storage capacity.

During the charging process, the external circuit 34 supplies energy to the cell 16, driving alkali metal ions from the cathode 26 back into the anode 28 through the molten salt electrolyte 32. The ceramic insulator 24 maintains the separation of the electrodes 26, 28 while enabling the flow of ions between the electrodes 26, 28. By optimizing the design and operation of the assembled battery cell 16, efficient ion migration and energy transfer can be achieved, resulting in a high-performance energy storage device capable of delivering power to various loads under different operating conditions.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of these disclosed materials.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method of forming an electrode, the method comprising:
    while concurrently applying negative potential to a bulk silicon blank and positive potential to a sacrificial electrode or a container holding a molten salt, comprising sodium hydroxide or lithium hydroxide, at a temperature of at least 500 degrees C., submerging for a predetermined period of time the bulk silicon blank and sacrificial electrode in the molten salt such that an electrolytic reaction of the molten salt with the bulk silicon blank drives sodium ions or lithium ions from the molten salt into a lattice of the bulk silicon blank resulting in formation of an anode and ductile deformation thereof; and
    after the predetermined period of time, removing the anode from the molten salt to cool the anode.

2. The method of claim 1 further comprising arranging a current collector in contact with the anode.

3. The method of claim 1, wherein the sodium ions or lithium ions are driven into the lattice such that after discharge, at least some of the sodium ions or lithium ions remain in the lattice.

4. The method of claim 1, wherein the predetermined period of time is sufficient to permit the anode to achieve a maximum holding capacity.

5. The method of claim 1, further comprising heating sodium or lithium hydroxide to form the molten salt.

6. The method of claim 1, wherein the bulk silicon blank is a silicon wafer.

7. A method of forming an electrode, the method comprising:
    heating sodium hydroxide or lithium hydroxide to at least 500 degrees C. to form a molten salt;
    attaching a negative terminal of a direct current power source to a silicon wafer and attaching a positive terminal of the direct current power source to a sacrificial electrode or the molten salt;
    lowering the silicon wafer, with the negative and positive terminals attached, into the molten salt to drive sodium ions or lithium ions into a lattice of the silicon wafer resulting in formation of an ion laden anode; and
    after the ion laden anode achieves maximum holding capacity, raising the ion laden anode out of the molten salt to cool the ion laden anode.

8. The method of claim 7, further comprising arranging a current collector in contact with the ion laden anode.

9. The method of claim 7, wherein the sodium ions or lithium ions are driven into the lattice such that after discharge, at least some of the sodium ions or lithium ions remain in the lattice.

10. A method of forming an electrode, the method comprising:
    preparing a molten salt by heating an alkali metal hydroxide to a temperature of at least 500 degrees C.;
    concurrently applying a negative potential to a bulk silicon blank and positive potential to a sacrificial electrode or container holding the molten salt; and immersing the silicon blank and sacrificial electrode in the molten salt to initiate an electrolytic reaction driving alkali metal ions from the molten salt into a lattice of the bulk silicon blank resulting in formation of an ion laden anode.

11. The method of claim 10 further comprising, after a predetermined period of time, subsequently removing the ion laden anode from the molten salt to allow it to cool.

12. The method of claim 10 further comprising arranging a current collector in contact with the ion laden anode.

13. The method of claim 10, wherein the alkali metal ions are driven into the lattice such that after discharge, at least some of the alkali metal ions remain in the lattice.

14. The method of claim 10, wherein the alkali metal ions are sodium or lithium ions.

\* \* \* \* \*